(12) United States Patent
Kolios et al.

(10) Patent No.: US 10,865,151 B2
(45) Date of Patent: Dec. 15, 2020

(54) GAS-TIGHT, HEAT-PERMEABLE MULTILAYER CERAMIC COMPOSITE TUBE

(71) Applicant: BASF SE, Ludwigshafen (DE)

(72) Inventors: Grigorios Kolios, Neustadt (DE); Sven Thate, Bad Duerkheim (DE); Carlos Tellaeche Herranz, Heidelberg (DE); Bernd Zoels, Gruenstadt (DE)

(73) Assignee: BASF SE, Ludwigshafen (DE)

( * ) Notice: Subject to any disclaimer, the term of this patent is extended or adjusted under 35 U.S.C. 154(b) by 342 days.

(21) Appl. No.: 15/574,692

(22) PCT Filed: May 12, 2016

(86) PCT No.: PCT/EP2016/060711
§ 371 (c)(1),
(2) Date: Nov. 16, 2017

(87) PCT Pub. No.: WO2016/184776
PCT Pub. Date: Nov. 24, 2016

(65) Prior Publication Data
US 2018/0134629 A1    May 17, 2018

(30) Foreign Application Priority Data
May 19, 2015   (EP) .................................. 15168207

(51) Int. Cl.
*C04B 37/00* (2006.01)
*F16L 9/10* (2006.01)
*F16L 13/007* (2006.01)

(52) U.S. Cl.
CPC .......... *C04B 37/005* (2013.01); *C04B 37/006* (2013.01); *C04B 37/008* (2013.01);
(Continued)

(58) Field of Classification Search
CPC ... C04B 37/005; C04B 37/006; C04B 37/008; C04B 2237/086; C04B 2237/341;
(Continued)

(56) References Cited

U.S. PATENT DOCUMENTS

| 4,222,977 A | 9/1980 | Dobo |
| 5,211,999 A | 5/1993 | Okada |

(Continued)

FOREIGN PATENT DOCUMENTS

| DE | 28 21 595 A1 | 4/1983 |
| DE | 39 07 087 A1 | 9/1990 |

(Continued)

OTHER PUBLICATIONS

International Search Report dated Sep. 12, 2016, in PCT/EP2016/060711, filed May 12, 2016.

(Continued)

*Primary Examiner* — Michael C Miggins
(74) *Attorney, Agent, or Firm* — Oblon, McClelland, Maier & Neustadt, L.L.P.

(57) ABSTRACT

The present invention relates to a gastight multilayer composite tube having a heat transfer coefficient of >500 W/m²/K and comprising at least two layers, namely a layer of nonporous monolithic oxide ceramic and a layer of oxidic fiber composite ceramic, a connecting piece comprising at least one metallic gas-conducting conduit which in the longitudinal direction of the composite tube overlaps in a region at least two ceramic layers, where the one ceramic layer comprises a nonporous monolithic ceramic and the other ceramic layer comprises a fiber composite ceramic, and also the use of the multilayer composite tube as reaction tube for endothermic reactions, radiation tubes, flame tubes or rotary tubes.

20 Claims, 3 Drawing Sheets

(52) U.S. Cl.
CPC ............... *F16L 9/10* (2013.01); *F16L 13/007* (2013.01); *C04B 2237/086* (2013.01); *C04B 2237/341* (2013.01); *C04B 2237/343* (2013.01); *C04B 2237/38* (2013.01); *C04B 2237/385* (2013.01); *C04B 2237/704* (2013.01); *C04B 2237/765* (2013.01); *C04B 2237/84* (2013.01)

(58) Field of Classification Search
CPC .......... C04B 2237/343; C04B 2237/38; C04B 2237/765; C04B 2237/84; C04B 2237/385; C04B 2237/704; F16L 9/10; F16L 13/007
See application file for complete search history.

(56) References Cited

U.S. PATENT DOCUMENTS

| | | | |
|---|---|---|---|
| 5,707,584 | A | 1/1998 | Terpstra et al. |
| 5,881,775 | A | 5/1999 | Owen et al. |
| 6,733,907 | B2 | 5/2004 | Morrison et al. |
| 2012/0003128 | A1 | 1/2012 | His et al. |
| 2015/0078505 | A1 | 3/2015 | Xu et al. |

FOREIGN PATENT DOCUMENTS

| | | |
|---|---|---|
| DE | 195 05 401 C1 | 4/1996 |
| DE | 10 2004 049 406 A1 | 4/2006 |
| DE | 10 2006 038 713 A1 | 11/2007 |
| DE | 10 2012 219 870 A1 | 5/2014 |
| JP | 2003-53166 A | 2/2003 |
| RU | 2 134 838 C1 | 8/1999 |
| WO | WO 2006/076039 A2 | 7/2006 |

OTHER PUBLICATIONS

Anonymous, "Fine Ceramics Offer a Wide Range of Thermal Conductivity", Fine Ceramics World. XP002759454. retrieved Jul. 4, 2016, 2 pages.

Written Opinion of the International Searching Authority with English translation and International Search Report dated Sep. 12, 2016 in PCT/EP2016/060711, filed May 12, 2016, (English translation of International Search Report previously filed), 25 pages.

Extended European Search Report dated Nov. 20, 2015 in Patent Application No. 15168207.7, (with English translation of Categories of Cited Documents), 7 pages.

Andrew J. Eckel, et al., "Hydrogen-Silicon Carbide Interactions" NASA Technical Memorandum 102382, Sep. 12-16, 1989, pp. 1-10 and cover pages.

Gary W. Hallum, et al., "High-Temperature Effect of Hydrogen on Sintered Alpha-Silicon Carbide" NASA Technical Memorandum 88819, Apr. 27-May 1, 1986, 25 Pages.

GAS-TIGHT, HEAT-PERMEABLE MULTILAYER CERAMIC COMPOSITE TUBE

The present invention relates to a gastight multilayer composite tube or regions of a multilayer composite tube having a heat transfer coefficient of >500 W/m²/K and comprising at least two layers, namely a layer of nonporous monolithic oxide ceramic and a layer of oxidic fiber composite ceramic.

Endothermic reactions frequently occur at the beginning of the value added chain of the chemical industry, for example in the cracking of petroleum fractions, the reforming of natural gas or naphtha, the dehydrogenation of propane, the dehydroaromatization of methane to form benzene or the pyrolysis of hydrocarbons. These reactions are strongly endothermic, i.e. temperatures in the range from 500° C. to 1700° C. are necessary to achieve technically and economically interesting yields.

For example, the process for producing synthesis gas and hydrogen from natural gas or naphtha comprises endothermic reaction steps which are carried out at high pressures and temperatures. The standard process according to the prior art is the reforming of natural gas using steam (steam reforming) or using carbon dioxide (dry reforming). This process requires a catalyst which is distributed over a plurality of reaction tubes. The reaction tubes are installed in furnaces and are fired by means of burners. The function of the tube walls is to transmit the heat flow from an external heat source into the reaction volume and to hermetically seal the reaction volume from the surrounding heat source while maintaining the pressure difference between the two spaces. The tubes of the fixed-bed reactors are typically cylindrical with a uniform diameter over the entire tube length. The material of the tubes is typically stainless steel; in some cases, ceramic materials are used.

Industrial reforming processes are operated at pressures of up to 30 bar and temperatures of up to 900° C., with this value representing the product gas temperature at the exit of the reaction tubes. The industrial process is heat transfer- and equilibrium-limited. The term "heat transfer-limited" means that the reaction kinetics become so fast that approximately the equilibrium conversion is achieved locally, but the further heat of reaction cannot be supplied sufficiently quickly via the wall of the reaction tubes. Thus, an appreciable difference from the wall temperature is established over the length and over the cross section of the reaction tube, and this limits the conversion. Equilibrium-limited means that the equilibrium conversion of the reaction increases with the temperature. In the case of a mixture having the customary initial composition of $H_2O:CH_4=3:1$ mol/mol, the equilibrium conversion is limited to 86.7% at 900° C. and 30 bar. When metallic reactor materials are used, the reaction temperature is limited to the abovementioned 900° C. by the heat resistance of the metallic reactor materials and the catalysts used.

A higher reaction temperature of 1300° C. or more would be desirable for a number of reasons, in particular in order to achieve a higher equilibrium conversion (>99.9%) and to achieve a sufficiently high reaction rate of the subsequent uncatalyzed reactions which are relevant for synthesis gas production, for example:

$CH_4+H_2O \leftrightarrows CO+3H_2$ $CH_4+CO_2 \leftrightarrows 2CO+2H_2$ $CH_4 \leftrightarrows C+H_2$ $CO_2+H_2 \leftrightarrows CO+H_2O$ $CO_2+C \leftrightarrows 2CO$.

The product composition is mainly determined by the C:O:H ratio of the starting materials. Accordingly, there is no need to increase the selectivity of individual reactions by means of a catalyst.

These temperatures of >1300° C. necessitate the use of ceramic materials, preferably oxide ceramics. The advantages of ceramic materials, in particular oxide ceramics, are high heat resistance to 1800° C., chemical passivity, corrosion resistance and high strength. The greatest disadvantage of ceramic materials is their high brittleness. This property is described by the fracture toughness $K_{IC}$, which is, for example, determined in accordance with DIN EN ISO 12737 for metals or in accordance with DIN EN ISO 15732 for monolithic ceramics. In the case of steel, a representative of tough materials, $K_{IC} \cong 50$ MPa√m. In the case of monolithic ceramics, for example zirconium oxide ($ZrO_2$) or α-alumina ($Al_2O_3$), $K_{IC} \cong 3-5$ MPa√m. As a result, monolithic ceramics are unsuitable for pressure apparatuses having a pressure of >0.5 bar since these materials cannot ensure the criterion "crack before fracture", but instead a sudden, unsignaled fracture could take place.

An alternative is provided by fiber composite ceramics consisting of oxidic fibers which are embedded in a porous matrix of oxidic ceramic. The porosity of fiber composite ceramics can attain values in the range from 25% to 50%. The advantages of fiber composite ceramics are high heat resistance to 1300° C. or more, high temperature change resistance and a pseudo ductile deformation and fracture behavior. The fracture toughness of fiber composite ceramics can attain values of $K_{IC} \cong 10\text{-}50$ MPaεm. As a result of the porous structure, fiber composite ceramics have a relatively low density, a relatively low modulus of elasticity and a relatively low thermal conductivity compared to monolithic ceramics having the same chemical composition. Table 1 comprises a list of the relevant standards for the determination of these parameters.

TABLE 1 list of the relevant standards for the determination of structural, mechanical and thermophysical parameters for monolithic ceramics and composite ceramics.

| Parameter | Monolithic ceramic | Fiber composite ceramic |
|---|---|---|
| Density, porosity | DIN EN 623-2 | DIN V ENV 1389 |
| E modulus | DIN V ENV 843-2 | DIN EN 658-1 |
| Fracture toughness[1] | DIN EN ISO 15732 | Single-edge-notch-bend[2] |
| Thermal diffusivity | DIN EN 821-2 | DIN V ENV 1159-2 |
| Specific heat capacity | DIN EN 821-3 | DIN V ENV 1159-3 |

[1]the fracture toughness of metallic materials is determined in accordance with DIN EN ISO 12737.
[2]M. Kuntz. Risswiderstand keramischer Faserverbundwerkstoffe, thesis at the University of Karlsruhe, Shaker Verlag, 1996.

The thermal conductivity is defined by means of the following relationship:

thermal conductivity=density×(specific heat capacity)×thermal diffusivity

By way of example, table 2 comprises a comparison between the properties of monolithic ceramics and fiber composite ceramics based on aluminum oxide.

TABLE 1 comparison of the physical properties of monolithic ceramics and composite ceramics

| Parameter | Monolithic ceramic Friatec Degussit ® AL23 | Fiber composite ceramic WHIPOX ® N610/45 |
|---|---|---|
| Porosity in % | 0 | 26 |
| Density in g/cm$^3$ | 3.8 | 2.9 |
| E modulus in GPa | 380 | 110 |
| Thermal conductivity in W/m/K | 30 (@100° C.) 5.5 (@1000° C.) | 5.7 (@200° C.) 2.7 (@1000° C.) |

A disadvantage of the porous structure of fiber composite ceramics is their unsuitability for the production of pressure apparatuses having a pressure of >0.5 bar. Furthermore, the poorer thermal conductivity compared to nonporous monolithic ceramic having the same chemical composition is a disadvantage, i.e. when a heat flow is to be transmitted through a layer of this material.

DE 2821595 A1 discloses a high-strength ceramic composite tube which comprises an inner tube composed of ceramic material and at least one outer tube which is composed of a metallic or ceramic material and is shrunk onto the inner tube. There is no reference to a fiber composite ceramic to be found here.

DE 3907087 A1 describes a high-pressure vessel having a wall made of a fiber composite material on an inner tube composed of metal-ceramic powder and an outer tube composed of metal. There is no reference to a multilayer structure having a ceramic inner or outer tube.

DE 102006038713 A1 discloses a pressure-resistant body, for example a pressure tube, consisting of a main element composed of steel, a first layer which is composed of ceramic fiber composite material and encloses the main element on the outside and at least one second layer which is composed of fiber-reinforced plastic and/or fiber-reinforced ceramic and is arranged on top of the first layer. The second layer composed of plastic prevents external heating of the tube. Working examples with purely ceramic outer tubes are not mentioned. There is no reference to a multilayer structure having a ceramic inner tube or an inner tube composed of fiber composite ceramic.

DE 102012219870 A1 discloses a process for producing a composite body composed of steel and a layer which is composed of a fiber composite material and encloses the main element on the outside at least in sections. To form the fiber composite material, the main element with a fiber material is impregnated with a resin before or after wrapping and is heated. An advantage is that this process can be carried out in situ, so that renovation of dilapidated pressure conduits is possible without interruption of operation. There is no reference to a multilayer structure having a ceramic inner tube or an inner tube composed of fiber composite ceramic.

DE 102004049406 A1 describes a multilayer shaped part made up of at least one long-fiber-reinforced composite material (1) and at least one short-fiber-reinforced composite material (2), wherein the long-fiber-reinforced composite material (1) comprises continuous ceramic fibers and ceramic matrix material and the short-fiber-reinforced composite material (2) comprises ceramic fibers having an average length in a range from 1 to 50 mm and ceramic matrix material, with the long-fiber-reinforced composite material (1) and the short-fiber-reinforced composite material (2) being firmly joined to one another over their area. There is no reference to a combination of a ceramic layer with a fiber composite layer.

U.S. Pat. No. 6,733,907 describes a composite of an interior ceramic support structure and an exterior ceramic thermal insulation layer. The thermal insulation layer has a thickness of from 2 to 5 mm and a porosity of >20%. The porosity of the structure gives both monolithic ceramics and also fiber composite ceramics a poorer thermal conductivity compared to a nonporous monolithic ceramic having the same chemical composition. The ceramic support structure can consist of continuous fibers in a ceramic matrix structure and has a thickness of from 3 to 10 mm. It is stated that the E modulus and the thermal conductivity of the thermal insulation layer are each lower than the corresponding value for the ceramic support structure. A disadvantage in terms of the above-formulated demands made of the function of the reaction tubes is the unsuitability of the porous composite structure for separating two spaces having an appreciable pressure difference from one another. Furthermore, the poor thermal conduction of the composite structure does not allow the heat flow required for the endothermic reaction to be transmitted without overheating of the wall.

US 2015/078505 describes a gastight, two-layer composite tube made of silicon carbide for ultimate storage of nuclear fuels, which comprises a dense monolithic SiC layer and a porous SiC—SiC fiber composite ceramic layer. The advantage of SiC ceramics within the ceramic family is the comparatively high thermal conductivity and the high temperature change resistance. The disadvantage of SiC ceramics is the comparatively low chemical resistance in respect of oxidizing or carburizing atmospheres. The thermodynamic analysis by Eckel et al (NASA Technical Memorandum, Wyoming, Sep. 12-16, 1989) and Hallum et al. (NASA Technical Memorandum, Chicago, Ill., Apr. 27-May 1, 1986) shows that oxidation-reduction cycles can take place in the industrially relevant range of from 0.1% to 1% volume fractions of methane, CO and/or water vapor, so that the SiC ceramic is corroded. FIG. 4 of Hallum et al. shows the influence of the temperature in the sintering process of SiC ceramics; above a temperature of 1100° C., the corrosion becomes so severe that individual crystals become detached from the surface. This corrosion is additionally reinforced by an atmosphere changing between reducing and oxidizing. As a consequence, SiC ceramics are not taken into consideration as reactor materials for endothermic reactions in oxidizing reaction atmospheres and reaction atmospheres which change periodically between reducing and oxidizing.

US 2012/0003128 describes a connecting piece between a tube made of nonporous monolithic ceramic and metallic feed conduits. The ceramic tube has a porosity of <5%. US 2012/0003128 is based on a frictional connection between the ceramic tube and the metallic connecting piece which surrounds the end section of the ceramic tube. The frictional connection is ensured by two concentrically arranged metal rings, with the inner ring being part of the connected conduit. The outer shrink ring has a lower thermal expansion than the inner ring; this is said to suppress the tendency of the inner shrink ring to become detached from the ceramic tube on heating. A disadvantage of this solution is that, due to metallic shrink rings being selected, the radial pressing-on force between the ceramic tube and the inner shrink ring varies with temperature. In the worst case, the impermeability of the connection can be impaired or the ceramic tube can be damaged. Furthermore, the greatest part of the ceramic tube, which is not surrounded by the shrink rings, remains unprotected in US 2012/0003128, i.e. the problem of the brittleness of this material remains unsolved.

A tube comprising at least two layers, namely a layer composed of nonporous monolithic oxide ceramic and a layer composed of oxidic fiber composite ceramic, is not to be confused with a ceramic hollow fiber as per JP 2003053166: the ceramic hollow fiber which is used in membrane technology has a capillary tube having an external diameter of from about 0.5 to 4 mm. The documents U.S. Pat. Nos. 4,222,977 and 5,707,584 describe the production of ceramic hollow fiber membranes. The tube wall can have a wall thickness in the range from 30 μm to 500 μm and is monolithic, i.e. its mechanical properties are identical to the properties of conventional monolithic ceramics. This means that ceramic hollow fibers are rigid and brittle and thus unsuitable for achieving a pseudo ductile deformation behavior as in the case of fiber composite ceramics. The combination of nonporous and porous ceramic described in JP 2003053166 leaves the capillary tube brittle and susceptible to fracture.

Accordingly, no materials which would be suitable for the production of reaction tubes which are usable at operating pressures of from 1 to 50 bar and reaction temperatures up to 1400° C. and heatable by means of an external heat source, usually a heating chamber, have hitherto been disclosed in the prior art.

The solutions which are based on the combination of a reinforcement composed of fiber composite ceramic and metallic tubes are unsuitable for overcoming the thermal and chemical limitations of the metallic materials, i.e. maximum reaction temperature up to about 950° C. and susceptibility to corrosion in an atmosphere which changes between oxidizing/reducing. The solutions based on the layer-wise combination of a reinforcement composed of fiber composite ceramic and shaped ceramic bodies do not comprise any teaching in respect of (i) effective heat transfer through the layers and (ii) chemical resistance and (iii) hermetic sealing of the reaction volume from the surrounding heating chamber at a pressure difference of up to 50 bar. In particular, hermetically sealed transitions between the tube ends and metallic conduits for the introduction of the reactants and for the discharge of the product streams into and out of the reaction tubes are unsolved.

The separation of the reaction volume from the surrounding heating chamber is solved in the following ways as a function of the required temperature in the prior art. At temperatures in the range up to <300° C., polymers are typically used as sealing elements. Furthermore, impregnation with polymers is a possibility. At temperatures of up to <400° C., metallic sleeves which are attached adhesively using solders or adhesives are employed. At temperatures up to <1000° C., the metallic sleeves are shrunk on so as to provide a frictional body (e.g. DE 1995105401). Said metal sleeves have to have thin walls in the range from 0.3 to 1 mm for this use. When such metal sleeves are employed, only pressure differences of not more than 3 bar can be achieved at high temperatures above 800° C., because the metal otherwise begins to flow.

It was accordingly an object of the present invention to provide a suitable material for reaction tubes which have the following property profile: (i) heat-permeable with a heat transfer coefficient of >500 W/m$^2$/K, (ii) heat resistant to about 1400° C., (iii) pressure resistant to about 50 bar or resistant at pressure differences of up to about 100 bar, (iv) corrosion resistant toward a reducing atmosphere and an oxidizing atmosphere having an oxygen partial pressure of from $10^{-25}$ bar to 10 bar and (v) temperature change resistant in accordance with DIN EN 993-11.

It was a further object of the present invention to provide a connecting unit/connecting piece between the material, i.e. the reactor tube, and the metallic gas-conducting conduits for the products and starting materials, which is likewise (i) heat resistant to above 1100° C., (ii) pressure resistant to 40 bar, (iii) corrosion resistant toward an oxidizing atmosphere and a reducing atmosphere and (iv) temperature change resistant.

The object has been achieved by means of a multilayer composite tube and by a multilayer composite tube section having a heat transfer coefficient of >500 W/m$^2$/K and comprising at least two layers, namely a layer of nonporous monolithic oxide ceramic and a layer of oxidic fiber composite ceramic.

It is advantageous for the inner layer of the multilayer composite tube to be composed of nonporous monolithic oxide ceramic and the outer layer to be composed of oxidic fiber composite ceramic.

The two layers advantageously adhere to one another by means of frictional or adhesive joins. Relevant frictional joins are, for example, screw connections or pressed joins. Relevant adhesive joins for the purposes of the present invention are soldering, adhesive bonding, sintering. All types of joins are prior art (W. Tochtermann, F. Bodenstein: Konstruktionselemente des Maschinenbaues, part 1. Grundlagen; Verbindungselemente; Gehäuse, Behälter, Rohrleitungen und Absperrvorrichtungen. Springer-Verlag, 1979).

The wall of the multilayer composite tube advantageously comprises, at least in regions, two layers, namely a layer of nonporous monolithic oxide ceramic and a layer of oxidic fiber composite ceramic; i.e. the multilayer composite tube can also be a composite tube section. A composite tube which is divided into zones or points and consists only in regions of two layers may be mentioned by way of example. However, preference is given to the entire wall of the composite tube which is exposed to an external temperature, e.g. by means of a heating chamber, of >1100° C., comprising at least two layers, namely a layer of nonporous monolithic oxide ceramic and a layer of oxidic fiber composite ceramic.

The multilayer composite tube advantageously does not have any metallic layers in the tube section which is exposed to an external temperature, e.g. by means of a heating chamber, of >1100° C.

The inner tube advantageously has a layer of oxidic fiber composite ceramic wrapped around it. The two layers can be frictionally or adhesively joined to one another and form one component. The properties of this component are determined by the heat resistance and deformation behavior of the layer of oxidic fiber composite ceramic. The impermeability is provided by the inner tube composed of oxide ceramic. When an oxide ceramic inner tube is used, the inside of the tube wall has a high chemical resistance and abrasion resistance, with a hardness of >14 000 MPa in the case of aluminum oxide, >12 000 MPa in the case of zirconium oxide.

At 1400° C., aluminum oxide and magnesium oxide, for example, are stable over the entire range of an oxygen partial pressure from 10-25 bar to 10 bar, while all other ceramic materials go through a transition between reduction and oxidation and therefore corrode (Darken, L. S., & Gurry, R. W. (1953). *Physical chemistry of metals*. McGraw-Hill).

The internal tube diameter of the multilayer composite tube is advantageously from 20 mm to 1000 mm, preferably from 50 mm to 800 mm, in particular from 100 mm to 500 mm. The total wall thickness made up of at least two layers is advantageously from 0.5 mm to 50 mm, preferably from 1 mm to 30 mm, in particular from 2 mm to 20 mm. Here, the thickness of the layer of oxidic fiber composite ceramic is advantageously less than 90%, preferably less than 50%, in particular less than 25%, of the total wall thickness; the thickness of the layer of oxidic fiber composite ceramic is advantageously at least 10% of the total wall thickness. The thickness of the layer of monolithic oxide ceramic is advantageously from 0.5 mm to 45 mm, preferably from 1 mm to 25 mm, particularly preferably from 3 mm to 15 mm. The thickness of the layer of oxidic fiber composite ceramic is advantageously from 0.5 mm to 5 mm, preferably from 0.5 mm to 3 mm.

The length of the multilayer composite tube is advantageously from 0.5 to 20 m, preferably from 1 to 10 m, in particular from 1.5 to 7 m.

The multilayer composite tube of the invention comprising at least one layer of nonporous monolithic oxide ceramic and at least one layer of oxidic fiber composite ceramic advantageously has an open porosity of ε<5%, preferably ε<4%, particularly preferably ε<3%, more preferably ε<2%, in particular ε<1%. The multilayer composite tube is particularly advantageously gastight. For the purposes of the present invention, the term "gastight" refers to a solid body which, in accordance with DIN EN 623-2, has an open porosity of zero. The permissible measurement inaccuracy is <0.3%.

The density of the nonporous monolithic oxide ceramic is advantageously greater than the density of the oxidic fiber composite ceramic. The density of the nonporous monolithic oxide ceramic is advantageously in the range from 1000 kg/m³ to 7000 kg/m³, in particular from 2000 kg/m³ to 5000 kg/m³, for example 2800 kg/m³ in the case of mullite (about 70% of aluminum oxide) or 3700 kg/m³ in the case of aluminum oxide having a purity of >99.7%. The density of the layer of fiber composite ceramic is in the range from 500 kg/m³ to 3000 kg/m³. The ratio of the densities of the monolithic ceramic and the fiber composite ceramic in the composite structure is advantageously in the range from 1:1 to 3:1, in particular from 1:1 to 2:1.

The material-dependent modulus of elasticity of the nonporous monolithic oxide ceramic is advantageously greater than the modulus of elasticity of the oxidic fiber composite ceramic. The modulus of elasticity of the nonporous monolithic oxide ceramic is advantageously in the range from 100 GPa to 500 GPa, in particular from 150 GPa to 400 GPa, for example 150 GPa in the case of mullite (about 70% of aluminum oxide) or 380 GPa in the case of aluminum oxide having a purity of >99.7%. The modulus of elasticity of the layer of fiber composite ceramic is in the range from 40 GPa to 200 GPa. These values are at 25° C. The ratio of the moduli of elasticity of the monolithic ceramic and the fiber composite ceramic in the composite structure is advantageously in the range from 1:1 to 5:1, in particular from 1:1 to 3:1.

The material-dependent thermal conductivity of the nonporous monolithic oxide ceramic is advantageously greater than the thermal conductivity of the oxidic fiber composite ceramic. The thermal conductivity of the nonporous monolithic oxide ceramic is advantageously in the range from 1 W/m/K to 50 W/m/K, in particular from 2 W/m/K to 40 W/m/K, for example 6 W/m/K in the case of mullite (about 70% of aluminum oxide) or 30 W/m/K in the case of aluminum oxide having a purity of >99.7%. The thermal conductivity of the layer of fiber composite ceramic is in the range from 0.5 W/m/K to 10 W/m/K, preferably from 1 W/m/K to 5 W/m/K. These values are at 25° C. The ratio of the thermal conductivities of the monolithic ceramic and the fiber composite ceramic in the composite structure is advantageously in the range from 1:1 to 10:1, in particular from 1:1 to 5:1.

The pressure reactor is designed for the following pressure ranges; advantageously 0.1 $bar_{abs}$ 100 $bar_{abs}$, preferably 1 $bar_{abs}$ 70 $bar_{abs}$, more preferably 1.5 $bar_{abs}$-50 $bar_{abs}$, in particular 5 $bar_{abs}$-30 $bar_{abs}$.

The pressure difference between the reaction chamber and the heating chamber is advantageously from 0 bar to 100 bar, preferably from 0 bar to 70 bar, more preferably from 0 bar to 50 bar, in particular from 0 bar to 30 bar.

The heat transfer coefficient of the multilayer composite tube is advantageously >500 W/m²/K, preferably >1000 W/m²/K, more preferably >2000 W/m²/K, in particular >3000 W/m²/K. The procedure for determining the heat transfer coefficient is known to those skilled in the art (chapter Cb: Warmedurchgang, VDI-Warmeatlas, 8$^{th}$ edition, 1997). According to this definition:

$$k_{loc} = \frac{1}{R_w \cdot A}, \text{ where}$$

$$R_w = \sum_{j=1}^{n} \left(\frac{\delta}{\lambda \cdot A_m}\right)_j$$

$$A_{m,j} = \left(\frac{A_1 - A_2}{\ln\frac{A_1}{A_2}}\right)_j$$

Here, the symbols have the following meanings:
$R_w$: heat transfer resistance of a multilayer cylindrical wall in K/W,
$k_{loc}$: heat transfer coefficient of a multilayer cylindrical wall in W/m²/K,
A: cylindrical wall area in m²,
λ: thermal conductivity of a homogeneous layer in W/m/K,
δ: thickness of a homogeneous layer in m,
π: number of the layers of a multilayer cylindrical wall,
the indices:
1: inside of a cylindrical layer,
2: outside of a cylindrical layer,
m: average area.

The multilayer composite tube of the invention can have a variable cross section and a variable wall thickness over its length. For example, the multilayer composite tube can widen or narrow in a funnel-like manner in the flow direction of the gas, with a cross section which becomes narrower in the flow direction being advantageous for fixed beds and a cross section which becomes wider being advantageous for fluidized beds.

At the two ends of the multilayer composite tube, the peripheral region of the outer layer can advantageously be sealed. The sealed ends serve as transitions to the gastight connection of the composite tube to metallic gas-conducting conduits, distributors, collectors or passages through the shell of the surrounding heating chamber.

As nonporous monolithic oxide ceramics, it is possible to use all oxidic ceramics known to those skilled in the art, in particular oxide ceramics analogous to those described in Informationszentrum Technische Keramik (IZTK): Brevier technische Keramik. Fahner Verlag, Lauf (2003). Preference is given to nonporous monolithic oxide ceramics comprising at least 99% by weight of $Al_2O_3$ and/or mullite. As nonporous ceramics, it is possible to use, in particular, Haldenwanger Pythagoras 1800Z™ (mullite), Alsint 99.7™ or Friatec Degussit® AL23 (aluminum oxide).

The fiber composite materials have a matrix composed of ceramic particles between which ceramic fibers, in particular long fibers, are embedded as wound body or as textile. Terms used here are fiber-reinforced ceramic, composite ceramic and fiber ceramic. Matrix and fibers can in principle consist of all known ceramic materials, with carbon also being considered to be a ceramic material in this context.

For the purposes of the present invention, an "oxidic fiber composite ceramic" is a matrix which is composed of oxidic ceramic particles and contains ceramic, oxidic and/or nonoxidic fibers.

Preferred oxides of the fibers and/or the matrix are oxides of an element from the group consisting of: Be, Mg, Ca, Sr, Ba, rare earths, Th, U, Ti, Zr, Hf, V, Nb, Ta, Cr, Mo, W, Mn, Fe, Co, Ni, Zn, B, Al, Ga, Si, Ge, Sn, Li, Na, K, Rb, Cs, Re, Ru, Os, Ir, Pt, Rh, Pd, Cu, Ag, Au, Cd, In, Tl, Pb, P, As, Sb, Bi, S, Se, Te, and mixtures of these oxides.

The mixtures are advantageously suitable both as material for the fibers and also for the matrix. Fibers and matrix generally have to be composed of different materials.

In principle, not only binary but also tertiary and higher mixtures are suitable and of importance.

In a mixture, the individual constituents can occur in the same molar amount, but mixtures having very different concentrations of the individual constituents of the mixture through to doping in which one component occurs in concentrations of <1% are advantageous.

The following mixtures are particularly advantageous: binary and ternary mixtures of aluminum oxide, zirconium oxide and yttrium oxide (e.g. zirconium oxide-reinforced aluminum oxide); mixtures of silicon carbide and aluminum oxide; mixtures of aluminum oxide and magnesium oxide (MgO spinel); mixtures of aluminum oxide and silicon oxide (mullite); mixture of aluminum silicate and magnesium silicate; ternary mixture of aluminum oxide, silicon oxide and magnesium oxide (cordierite); steatite (magnesium silicate); zirconium oxide-reinforced aluminum oxide; stabilized zirconium oxide ($ZrO_2$); stabilizers in the form of magnesium oxide (MgO), calcium oxide (CaO) or yttrium oxide ($Y_2O_3$), with cerium oxide ($CeO_2$), scandium oxide ($ScO_3$) or ytterbium oxide ($YbO_3$) optionally also being used as stabilizers; also aluminum titanate (stoichiometric mixture of aluminum oxide and titanium oxide); silicon nitride and aluminum oxide (silicon-aluminum oxynitrides SIALON).

As zirconium oxide-reinforced aluminum oxide, it is advantageous to use $Al_2O_3$ comprising from 10 to 20 mol % of $ZrO_2$. To stabilize $ZrO_2$, from 10 to 20 mol % of CaO, preferably 16 mol %, from 10 to 20 mol % of MgO, preferably 16 mol %, or from 5 to 10 mol % of $Y_2O_3$, preferably 8 mol % ("fully stabilized zirconium oxide") or from 1 to 5 mol % of $Y_2O_3$, preferably 4 mol % ("partially stabilized zirconium oxide") can advantageously be used. An example of an advantageous ternary mixture is 80% of $Al_2O_3$, 18.4% of $ZrO_2$ and 1.6% of $Y_2O_3$.

Apart from the materials mentioned (mixtures and individual constituents), fibers composed of basalt, boron nitride, tungsten carbide, aluminum nitride, titanium dioxide, barium titanate, lead zirconate titanate and/or boron carbide in an oxide-ceramic matrix are also conceivable.

To achieve desired reinforcement through the at least two layers, the fibers of the fiber-reinforced carbon can be arranged radially circumferentially and/or crossing one another on the first layer of the nonporous ceramic.

Possible fibers are reinforcing fibers which come under the classes of oxidic, carbidic, nitridic fibers or C fibers and SiBCN fibers. In particular, the fibers of the ceramic composite material are aluminum oxide, mullite, silicon carbide, zirconium oxide and/or carbon fibers. Mullite here consists of mixed crystals of aluminum oxide and silicon oxide. Preference is given to using fibers composed of oxide ceramic ($Al_2O_3$, $SiO_2$, mullite) or of nonoxide ceramic (C, SiC).

It is advantageous to use creep-resistant fibers, i.e. fibers which display no increase or a minimal increase over time of the permanent deformation, i.e. the creep strain, in the creep region, in the temperature range up to 1400° C. The 3M company indicates the following limit temperatures for the permanent elongation of 1% after 1000 hours under a tensile stress of 70 MPa for the NEXTEL fibers: NEXTEL 440: 875° C., NEXTEL 550 and NEXTEL 610: 1010° C., NEXTEL 720: 1120° C. (reference: Nextel™ Ceramic Textiles Technical Notebook, 3M, 2004).

The fibers advantageously have a diameter in the range from 10 to 12 μm. They are advantageously interwoven, usually in a linen weave or satin weave, to give textile sheets, knitted to form hoses or wound as fiber bundles around a pattern. To produce the ceramic composite system, the fiber bundles or woven fiber fabrics are, for example, infiltrated with a slip which comprises the components of the future ceramic matrix, advantageously $Al_2O_3$ or mullite (Schmücker, M. (2007), Faserverstärkte oxidkeramische Werkstoffe, Materialwissenschaft und Werkstofftechnik, 38(9), 698-704). Finally, a high-strength composite structure composed of the ceramic fibers and the ceramic matrix and having a tensile strength of advantageously >50 MPa, preferably >70 MPa, more preferably >100 MPa, in particular >120 MPa, is formed by heat treatment at >700° C.

Preference is given to using $SiC/Al_2O_3$, SiC/mullite, $C/Al_2O_3$, C/mullite, $Al_2O_3/Al_2O_3$, $Al_2O_3$/mullite, mullite/$Al_2O_3$ and/or mullite/mullite as the ceramic fiber composite material. Here, the material before the forward slash refers to the fiber type and the material after the forward slash refers to the matrix type. As matrix system for the ceramic fiber composite structure, it is also possible to use siloxanes, Si precursors and a variety of oxides, including, for example, zirconium oxide. The ceramic fiber composite material preferably comprises at least 99% by weight of $Al_2O_3$ and/or mullite.

In the present invention, preference is given to using fiber composite materials based on oxide ceramic fibers, for example 3M™ NEXTEL™ 312, NEXTEL™ 440, NEXTEL™ 550, NEXTEL™ 610 or NEXTEL™ 720. Particular preference is given to using NEXTEL 610 and/or NEXTEL 720.

The matrix has a degree of fill of fibers (proportion by volume of the fibers in the composite structure) of from 20 to 40%, and the total solids content of the composite structure is in the range from 50 to 80%. Fiber composite ceramics based on oxidic ceramic fibers are chemically resistant in an oxidizing gas atmosphere and in a reducing gas atmosphere (i.e. no weight change after storage in air at 1200° C. for 15 hours (reference: Nextel™ Ceramic Textiles Technical Notebook, 3M, 2004)) and heat stable up to above 1300° C. Fiber composite ceramics have a pseudo ductile deformation behavior. They are thus temperature change resistant and have a pseudo tough fracture behavior. Thus, the failure of a component is signaled before the component fractures.

The fiber composite material advantageously has a porosity of from 20% to 50%; it is accordingly not gastight as per the definition in DIN 623-2.

The fiber composite material advantageously has a long-term use temperature of up to 1500° C., preferably up to 1400° C., particularly preferably up to 1300° C.

The fiber composite material advantageously has a strength of >50 MPa, preferably >70 MPa, particularly preferably >100 MPa, in particular >120 MPa.

The fiber composite material advantageously has a limit of elastic deformation of from 0.2 to 1%.

The fiber composite material advantageously has a temperature change resistance in accordance with DIN EN 993-11.

The fiber composite material advantageously has a coefficient of thermal expansion [ppm/K] of from 4 to 8.5.

The fiber composite material advantageously has a thermal conductivity of from 0.5 to 5 W/m/K auf.

The ceramic fiber composite material can be produced by CVI (chemical vapor infiltration) processes, pyrolysis, in particular LPI (liquid polymer infiltration) processes, or by chemical reaction such as LSI (liquid silicon infiltration) processes.

Figure 1A:
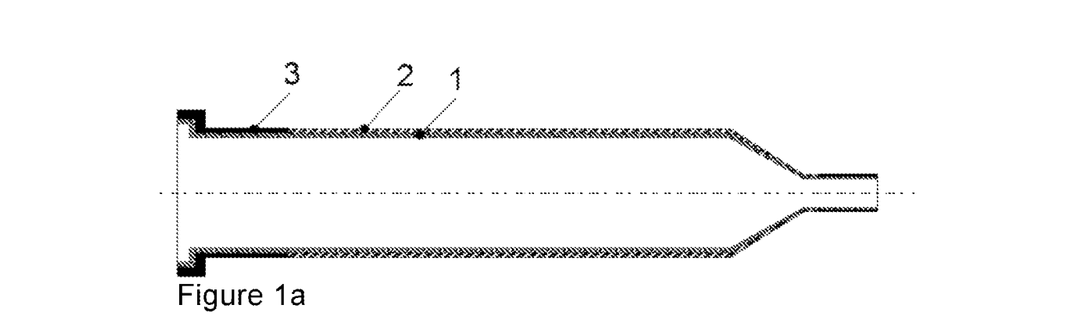
FIG. 1a a schematic depiction of a gastight multilayer composite tube having a variable diameter, FIGS. 1b/1c/1d a schematic depiction of the connecting pieces, FIG. 2 a schematic depiction of a variant of the solution consisting of two concentric tubes, FIG. 3a a schematic depiction of a gastight multilayer sandwich tube having a variable diameter, FIGS. 3b/3c a schematic depiction of the connecting pieces.
Figure 3A:
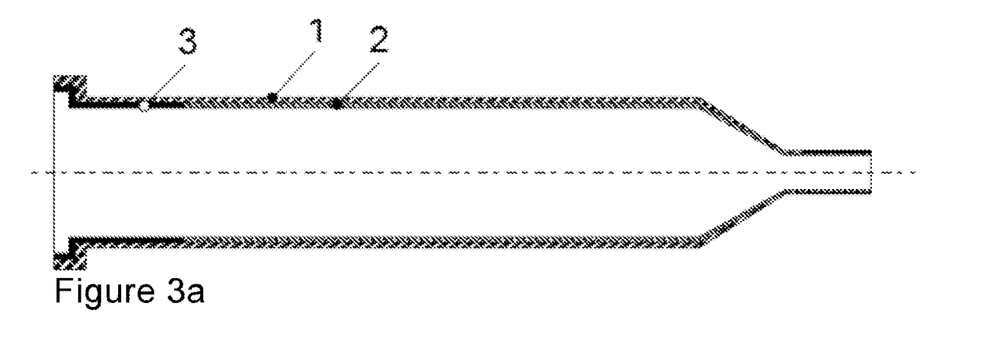

The sealing of the two ends or one end of the multilayer composite tube can be carried out in a variety of ways: for example, a seal can be achieved by infiltration or coating of the outer layer or of the inner layer composed of fiber composite ceramic or nonporous monolithic ceramic with a polymer, a nonporous ceramic, pyrolytic carbon and/or a metal (FIG. 1a and FIG. 3a). The sealed regions serve as sealing areas. This variant can be used up to a temperature range of <400° C. The composite tube is advantageously coated only in the peripheral region to the metallic connecting piece. "Peripheral region" means the last section before the transition to another material, preferably to a metallic material, having a length corresponding to from 0.05 to 10 times the internal diameter of the composite tube, preferably corresponding to 0.1-5 times the internal diameter, in particular corresponding to 0.2-2 times the internal diameter. The thickness of the impregnation advantageously corresponds to the total layer thickness of the fiber composite ceramic in the peripheral region. Processes for impregnation are known to those skilled in the art.

The present invention accordingly comprises a multilayer composite tube comprising at least two layers, namely a layer of nonporous monolithic ceramic, preferably oxide ceramic, and a layer of fiber composite ceramic, preferably oxidic fiber composite ceramic, where the outer layer of the composite tube has been impregnated or coated with polymer, nonporous ceramic, (pyrolytic) carbon and/or a metallic material in the peripheral region before the transition to another material, preferably metallic material.

Figure 1B:
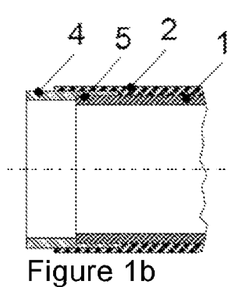

Another possible way of effecting sealing advantageously comprises installation of a sleeve composed of metal on the peripheral region of the multilayer composite tube, which sleeve is arranged in a region by means of an overlap joint (5), as can be seen in FIG. 1b, between the inner layer and the outer layer (FIG. 1b). The sleeve composed of metal advantageously comprises one or more of the following materials: chromium, titanium, molybdenum, nickel steel 47Ni, alloy 80Pt20Ir, alloy 1.3981, alloy 1.3917 or a trimetal copper/Invar/copper. The ratio of the length of the overlap joint (5) to the internal diameter of the composite tube is advantageously in the range from 0.05 to 10, preferably from 0.1 to 5, in particular from 0.2 to 2.

In this region, the sleeve composed of metal is joined in a gastight manner to the outside of the inner layer by means of joining techniques as are known to those skilled in the art (Informationszentrum Technische Keramik (IZTK): Brevier technische Keramik, Fahner Verlag, Lauf (2003)). The outer layer is joined by an adhesive bond to the sleeve composed of metal. The length of the ceramic overlap, i.e. the region comprising outer layer and metallic sleeve without inner layer, is advantageously from 0.05 times to 10 times, preferably from 0.1 times to 5 times, in particular form 0.2 times to 2 times, the internal diameter of the composite tube.

The present invention accordingly comprises a multilayer composite tube comprising at least two layers, namely a layer of nonporous monolithic ceramic, preferably oxide ceramic, and a layer of fiber composite ceramic, preferably oxidic fiber composite ceramic, where a sleeve composed of metal is arranged at the end of the composite tube, which sleeve is located in a region between the inner layer and the outer layer.

The present invention consequently comprises a connecting piece comprising at least one metallic gas-conducting conduit which, in the longitudinal direction of the multilayer composite tube, i.e. in the flow direction of the starting materials, overlaps in a region with at least two ceramic layers, where at least one ceramic layer comprises a nonporous monolithic ceramic, preferably oxide ceramic, and at least one other ceramic layer comprises a fiber composite ceramic, preferably oxidic fiber composite ceramic.

The present invention consequently comprises a sandwich structure in the transition region between metallic material and ceramic material comprising a metallic layer, a nonporous monolithic ceramic layer, preferably oxide ceramic, and a fiber composite ceramic layer, preferably oxide fiber composite ceramic. The metallic layer is preferably located between the inner ceramic layer and the outer ceramic layer.

The present invention advantageously comprises a connecting piece which has a first tube region comprising a metallic tube, e.g. at least one metallic gas-conducting conduit, which connecting piece has a second tube region which adjoins the first tube region and has an outer layer of fiber composite ceramic and an inner metallic layer, which connecting piece has a third tube region which adjoins the second tube region and has a sandwich structure comprising a metallic layer, a nonporous monolithic ceramic layer and a fiber composite ceramic layer, and which connecting piece has a fourth tube region which adjoins the third tube region and has a multilayer composite tube comprising at least two layers, namely a layer of nonporous monolithic ceramic and a layer of fiber composite ceramic (FIG. 1b).

The sandwich structure of the connecting piece advantageously comprises an inner ceramic layer, a middle metallic layer and an outer ceramic layer. The fiber composite ceramic is advantageously the outer ceramic layer. The nonporous monolithic ceramic layer is advantageously the inner layer. As an alternative, the fiber composite ceramic is the inner ceramic layer. As an alternative, the nonporous monolithic ceramic layer is the outer layer. The fiber composite ceramic is preferably oxidic. The nonporous monolithic ceramic is preferably an oxide ceramic.

The length of the first tube region is greater than 0.05 times, preferably greater than 0.1 times, in particular greater than 0.2 times, the internal diameter of the multilayer composite tube; the length of the first tube region is advantageously less than 50% of the total length of the composite tube.

The length of the second tube region is from 0.05 times to 10 times, preferably from 0.1 times to 5 times, in particular from 0.2 times to 2 times, the internal diameter of the multilayer composite tube.

The length of the third tube region is from 0.05 times to 10 times, preferably from 0.1 times to 5 times, in particular from 0.2 times to 2 times, the internal diameter of the composite tube.

In the third tube region, the wall thickness of the metallic tube, i.e. the metallic overlap, is advantageously from 0.01 times to 0.5 times the total wall thickness, preferably from 0.03 times to 0.3 times the total wall thickness, in particular from 0.05 times to 0.1 times the total wall thickness.

In the second tube region, the wall thickness of the ceramic overlap is advantageously from 0.05 times to 0.9 times the total wall thickness, preferably from 0.05 times to 0.5 times the total wall thickness, in particular from 0.05 times to 0.25 times the total wall thickness. In the second tube region, the wall thickness of the sleeve is advantageously from 0.05 times to 0.9 times the total wall thickness, preferably from 0.05 times to 0.5 times the total wall thickness, in particular from 0.05 times to 0.025 times the total wall thickness.

The thickness of the layer of monolithic ceramic is advantageously from 0.5 mm to 45 mm, preferably from 1 mm to 25 mm, particularly preferably from 3 mm to 15 mm. The thickness of the layer of oxidic fiber composite ceramic is advantageously from 0.5 mm to 5 mm, preferably from 0.5 mm to 3 mm.

Figure 1C:
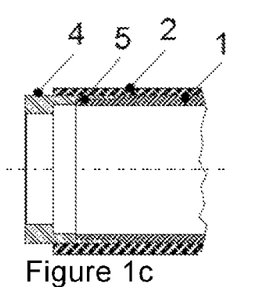

Another possible way of effecting sealing advantageously comprises installation of a sleeve composed of metal at the end of the multilayer composite tube, the inner and outer surfaces of which sleeve are joined in a region to the inner layer and to the outer layer (FIG. 1c). The join to the inner layer is made gastight by means of joining techniques which are known to those skilled in the art (Informationszentrum Technische Keramik (IZTK): Brevier technische Keramik, Fahner Verlag, Lauf (2003)). The join to the outer layer is adhesive.

The present invention advantageously comprises a connecting piece which has a first tube region comprising a metallic tube, e.g. at least one metallic gas-conducting conduit, which connecting piece has a second tube region which adjoins the first tube region and has an outer ceramic layer and an inner metallic layer, which connecting piece has a third tube region which adjoins the second tube region and has a sandwich structure comprising an inner metallic layer, a middle ceramic layer and an outer ceramic layer, where one of the ceramic layers has a nonporous monolithic ceramic layer and the other ceramic layer has a fiber composite ceramic layer, and which connecting piece has a fourth tube region which adjoins the third tube region and has a multilayer composite tube comprising at least two layers, namely a layer of nonporous monolithic ceramic and a layer of fiber composite ceramic (FIG. 1c).

The fiber composite ceramic is advantageously the outer ceramic layer. The nonporous monolithic ceramic layer is advantageously the inner layer. As an alternative, the fiber composite ceramic is the inner ceramic layer. As an alternative, the nonporous monolithic ceramic layer is the outer layer. The fiber composite ceramic is preferably oxidic. The nonporous monolithic ceramic is preferably an oxide ceramic.

The length of the first tube region is greater than 0.05 times, preferably greater than 0.1 times, in particular greater than 0.2 times, the internal diameter of the multilayer composite tube; the length of the first tube region is advantageously less than 50% of the total length of the composite tube.

The length of the second tube region is from 0.05 times to 10 times, preferably from 0.1 times to 5 times, in particular form 0.2 times to 2 times, the internal diameter of the multilayer composite tube.

The length of the third tube region is from 0.05 times to 10 times, preferably from 0.1 times to 5 times, in particular from 0.2 times to 2 times, the internal diameter of the composite tube.

In the third tube region, the wall thickness of the metallic tube, i.e. of the metallic overlap, is advantageously from 0.01 times to 0.5 times the total wall thickness, preferably from 0.03 times to 0.3 times the total wall thickness, in particular from 0.05 to 0.1 times the total wall thickness.

In the second tube region, the wall thickness of the ceramic overlap is advantageously from 0.1 times to 0.95 times the total wall thickness, preferably from 0.5 times to 0.95 times the total wall thickness, in particular from 0.8 times to 0.95 times the total wall thickness. In the second tube region, the wall thickness of the sleeve is advantageously from 0.05 times to 0.9 times the total wall thickness, preferably from 0.05 times to 0.5 times the total wall thickness, in particular from 0.05 times to 0.2 times the total wall thickness.

The thickness of the layer of monolithic ceramic is advantageously from 0.5 mm to 45 mm, preferably from 1 mm to 25 mm, particularly preferably from 3 mm to 15 mm. The thickness of the layer of oxidic fiber composite ceramic is advantageously from 0.5 mm to 5 mm, preferably from 0.5 mm to 3 mm.

Figure 3B:
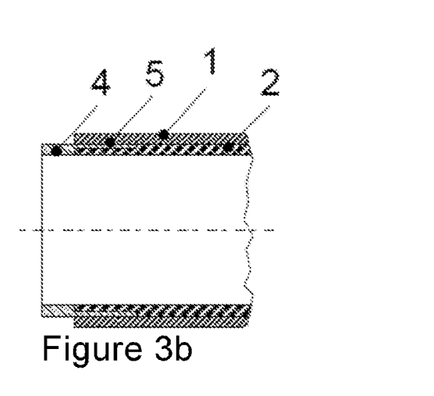

The present invention advantageously comprises a connecting piece which has a first tube region comprising a metallic tube, e.g. at least one metallic gas-conducting conduit, which connecting piece has a second tube region which adjoins the first tube region and has a sandwich structure comprising an inner ceramic layer, a middle metallic layer and an outer ceramic layer, where one of the ceramic layers has a nonporous monolithic ceramic layer and the other ceramic layer has a fiber composite ceramic layer, and which connecting piece has a third tube region which adjoins the second tube region and has a multilayer composite tube comprising at least two layers, namely a layer of nonporous monolithic ceramic and a layer of fiber composite ceramic (FIG. 3b).

The fiber composite ceramic is advantageously the inner ceramic layer. The nonporous monolithic ceramic layer is advantageously the outer layer. As an alternative, the fiber composite ceramic is the outer ceramic layer. As an alternative, the nonporous monolithic ceramic layer is the inner layer. The fiber composite ceramic is preferably oxidic. The nonporous monolithic ceramic is preferably an oxide ceramic.

The length of the second tube region is from 0.05 times to 10 times, preferably from 0.1 times to 5 times, in particular from 0.2 times to 2 times, the internal diameter of the multilayer composite tube.

In the second tube region, the wall thickness of the metallic tube, i.e. of the metallic overlap, is advantageously from 0.01 times to 0.5 times the total wall thickness, preferably from 0.03 times to 0.3 times the total wall thickness, in particular from 0.05 times to 0.1 times the total wall thickness.

In the second tube region, the wall thickness of the ceramic overlap is advantageously from 0.1 times to 0.95 times the total wall thickness, preferably from 0.5 times to 0.95 times the total wall thickness, in particular from 0.8 times to 0.95 times the total wall thickness. In the second tube region, the wall thickness of the sleeve is advantageously from 0.05 times to 0.9 times the total wall thickness, preferably from 0.05 times to 0.5 times the total wall thickness, in particular from 0.05 times to 0.2 times the total wall thickness.

The thickness of the layer of monolithic ceramic is advantageously from 0.5 mm to 45 mm, preferably from 1 mm to 25 mm, particularly preferably from 3 mm to 15 mm. The thickness of the layer of oxidic fiber composite ceramic is advantageously from 0.5 mm to 5 mm, preferably from 0.5 mm to 3 mm.

Figure 3C:
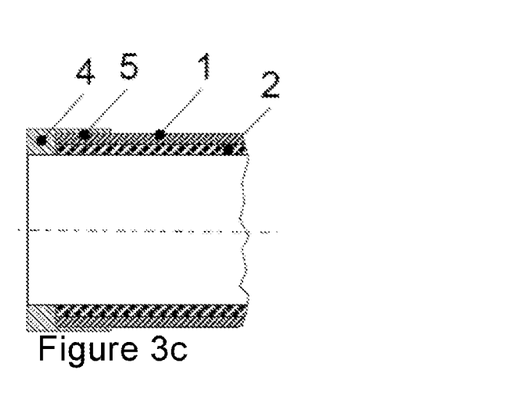

The present invention advantageously comprises a connecting piece which has a first tube region comprising a metallic tube, e.g. at least one metallic gas-conducting conduit, which connecting piece has a second tube region which adjoins the first tube region and has a sandwich structure comprising an inner ceramic layer and a middle ceramic layer and an outer metallic layer, where one of the ceramic layers has a nonporous monolithic ceramic layer and the other ceramic layer has a fiber composite ceramic layer, and which connecting piece has a third tube region which adjoins the second tube region and has a multilayer composite tube comprising at least two layers, namely a layer of nonporous monolithic ceramic and a layer of fiber composite ceramic (FIG. 3c).

The fiber composite ceramic is advantageously the inner ceramic layer. The nonporous monolithic ceramic layer is advantageously the outer layer. As an alternative, the fiber composite ceramic is the outer ceramic layer. As an alternative, the nonporous monolithic ceramic layer is the inner layer. The fiber composite ceramic is preferably oxidic. The nonporous monolithic ceramic is preferably an oxide ceramic.

The length of the second tube region is from 0.05 times to 10 times, preferably from 0.1 times to 5 times, in particular from 0.2 times to 2 times, the internal diameter of the multilayer composite tube.

In the second tube region, the wall thickness of the metallic tube, i.e. the metallic overlap, is advantageously from 0.01 times to 0.5 times the total wall thickness, preferably from 0.03 times to 0.3 times the total wall thickness, in particular from 0.05 times to 0.1 times the total wall thickness.

In the second tube region, the wall thickness of the ceramic overlap is advantageously from 0.1 times to 0.95 times the total wall thickness, preferably from 0.5 times to 0.95 times the total wall thickness, in particular from 0.8 times to 0.95 times the total wall thickness. In the second tube region, the wall thickness of the sleeve is advantageously from 0.05 times to 0.9 times the total wall thickness, preferably from 0.05 times to 0.5 times the total wall thickness, in particular from 0.05 times to 0.2 times the total wall thickness.

The thickness of the layer of monolithic ceramic is advantageously from 0.5 mm to 45 mm, preferably from 1 mm to 25 mm, particularly preferably from 3 mm to 15 mm. The thickness of the layer of oxidic fiber composite ceramic is advantageously from 0.5 mm to 5 mm, preferably from 0.5 mm to 3 mm.

The ends of the multilayer composite tube are advantageously thermostated to a temperature level which lies within the limits of the heat resistance of the impregnation or coating, the seal, the metal-ceramic bond and the metal sleeve. Advantageous regions are: <1000° C. (water glass), <500° C. (soldering/mica seal), <400° C. (soldering/graphite), <300° C. (polymer seals Kalrez), <250° C. (silicone rubber, Viton). The structural solutions and process procedure concepts suitable therefor are known to those skilled in the art. The middle region, advantageously from 20% to 99% of the total length, preferably from 50% to 99% of the total length, in particular from 90% to 99% of the total length, of the composite tube is arranged in a heating chamber and can be heated to temperatures up to 1300° C. or above; advantageously from 900° C. to 1700° C., preferably from 1000° C. to 1600° C., in particular from 1100° C. to 1500° C.

The multilayer composite tube is typically arranged vertically, mounted in a fixed manner at one end and mounted loosely at the other end. Preference is given to it being clamped in a fixed manner at the lower end and being arranged movably in an axial direction at the upper end. In this arrangement, the tube can undergo thermal expansion without stresses.

Figure 1D:
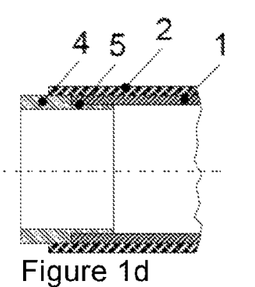
Figure 2:
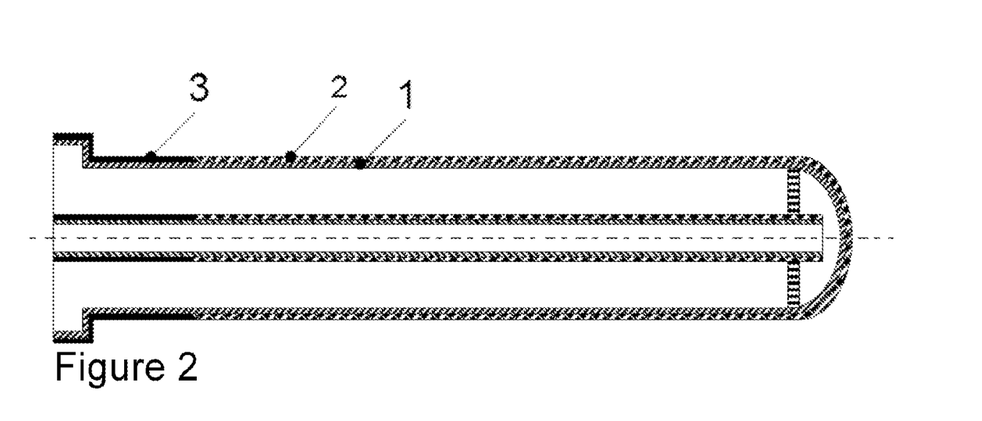

One variant of the solution consists of two concentric tubes (FIG. 2). The inner tube advantageously has an internal tube diameter of from 10 mm to 100 mm, preferably from 15 mm to 50 mm, in particular from 20 mm to 30 mm. The inner tube is advantageously open at both ends and the outer tube is advantageously closed at one end. The outer tube advantageously has an internal tube diameter of from 20 mm to 1000 mm, preferably from 50 mm to 800 mm, in particular from 100 mm to 500 mm. At the open peripheral region, the walls of the inner and outer tubes are advantageously sealed. The main reaction section is advantageously located in the annular space between the inner tube and the outer tube. In this case, the reactants can either be introduced into the annular space and the product stream taken off from the inner tube or vice versa. The connections for the feed conduit and the discharge conduit are located at the open end of the tube. The closed end of the tube can project loosely (without any guide) into the heating space and expand unhindered there. In this way, no temperature-induced stresses can arise in the axial direction. This configuration ensures that the multilayer composite tubes have to be clamped in and sealed cold only at one end and can undergo thermal expansion unhindered at the closed end. The options shown in FIGS. 1b, 1c and 1d for sealing the open end can be applied to this variant.

The present invention thus comprises a double-tube reactor for endothermic reactions, wherein the reactor comprises two multilayer composite tubes having a heat transfer coefficient of >500 W/m$^2$/K and comprising in each case at least two layers, namely a layer of nonporous monolithic ceramic and a layer of fiber composite ceramic, where the one composite tube encloses the other composite tube and the inner composite tube is open at both ends and the outer tube is closed at one end.

The fiber composite ceramic is advantageously the outer ceramic layer of the multilayer composite tube comprising two concentric tubes. The nonporous monolithic ceramic layer is advantageously the inner layer. As an alternative, the fiber composite ceramic is the inner ceramic layer. As an alternative, the nonporous monolithic ceramic layer is the outer layer. The fiber composite ceramic is preferably oxidic. The nonporous monolithic ceramic is preferably an oxide ceramic.

As a result of the double-layer structure, the impermeability and heat resistance of a tube made of monolithic nonporous ceramic can be combined with the friendly failure behavior of the fiber composite ceramic ("crack before fracture"). The apparatus according to the invention having sealed peripheral regions makes gastight connection of the multilayer composite tubes at the conventionally configured peripheral possible.

The ceramic multilayer composite tubes of the invention are advantageously used for the following processes:

production of synthesis gas by reforming of hydrocarbons using steam and/or $CO_2$.

Coproduction of hydrogen and pyrolysis carbon by pyrolysis of hydrocarbons.

Preparation of hydrocyanic acid from methane and ammonia (Degussa) or from propane and ammonia.

Preparation of olefins by steam cracking of hydrocarbons (naphtha, ethane, propane).

Coupling of methane to form ethylene, acetylene and to form benzene.

The ceramic composite tubes of the invention are advantageously used as reaction tubes in the following applications:

reactors having axial temperature control, for example
   fluidized-bed reactors,
   shell-and-tube reactors,
   reformer and dissociation furnaces.
Radiation tubes, flame tubes.
Countercurrent reactors.
Membrane reactors.
Rotary tubes for rotary tube furnaces.

Further objectives, features, advantages and possible uses can be derived from the following figures. Here, all features described and/or depicted form, on their own or in any combination, the subject matter of the present invention, regardless of the way in which they are combined in the claims or their back-references.

The following abbreviations are used:
1: nonporous monolithic ceramic
2: fiber composite ceramic
3: sealed region in the fiber composite ceramic
4: metal sections
5: overlap joint between the metal section and the nonporous monolithic ceramic

EXAMPLE 1 (COMPARATIVE EXAMPLE)

The test specimen was a tube having a monolithic wall composed of dense α-alumina (product of Friatec having the product number 122-11035-0) and having the following dimensions (external diameter×internal diameter×length): 35 mm×29 mm×64 mm. The heat transfer coefficient of the tube wall was, based on the inside of the wall: $k_{loc}$=9200 (W/m²/K). The tube was exposed to the flame of a welding torch. The welding torch was supplied with acetylene and oxygen and equipped with a welding head type Gr3, A, 6-9, S2.5 bar. The flame was set neutrally with a stoichiometric ratio λ=1.15 air/acetylene. The torch tip was directed perpendicularly at the tube wall at a distance of 50 mm. After about 3 seconds, the tube fractured. The test was therefore ended. This test confirmed the thermal shock sensitivity of monolithic ceramics.

EXAMPLE 2

The test specimen was a tube having a two-layer wall. The wall of the core tube consisted of dense monolithic α-alumina (product of Friatec having the product number 122-11035-0) with the following dimensions (external diameter×internal diameter×length): 35 mm×29 mm×64 mm. A layer of fiber composite ceramic (ceramic sheet type FW12) having a layer thickness of about 1 mm was wrapped around the core tube. The heat transfer coefficient of the tube wall was, based on the inside of the wall: $k_{loc}$=3120 (W/m²/K). The tube was exposed to the flame of a welding torch. The welding torch was supplied with acetylene and oxygen and equipped with a welding head type Gr3, A, 6-9, S2.5 bar. The flame was set neutrally with a stoichiometric ratio λ=1.15 air/acetylene. The tip of the torch was directed perpendicularly at the tube wall at a distance of 50 mm. In this case, a white-hot spot having a length of about 25 mm (T>1300° C.) was formed on the outer wall of the tube within 4 seconds. The flame was taken away from the tube after 20 seconds and after another 30 seconds was again directed at the tube for 20 seconds. The tube withstood this thermal shock without damage.

The invention claimed is:

1. A multilayer composite tube, comprising:
a first layer comprising a nonporous monolithic oxide ceramic; and
a second layer comprising oxidic fiber composite ceramic,
wherein the tube has a heat transfer coefficient of >1000 W/m²/K in a temperature range of from 500 to 1700° C.,
wherein the second layer has a thickness in a range of from 0.5 mm to 3 mm,
wherein the first and second layers are joined frictionally or adhesively to one another and form one component, and
wherein the oxidic fiber composite ceramic is a matrix comprising (a) oxidic ceramic particles and (b1) oxidic and/or (b2) nonoxidic ceramic fibers.

2. The tube of claim 1, wherein a total wall thickness made up of the at least two layers is from 0.5 mm to 50 mm.

3. The tube of claim 1, having an internal tube diameter in a range of from 20 mm to 1000 mm.

4. The tube of claim 1, having an open porosity of ε<5%.

5. The tube of claim 1, wherein a thickness of the second layer is less than 25% of a total wall thickness.

6. The tube of claim 1, wherein a modulus of elasticity of the nonporous monolithic oxide ceramic is greater than a modulus of elasticity of the oxidic fiber composite ceramic.

7. The tube of claim 1, wherein a thermal conductivity of the nonporous monolithic oxide ceramic is greater than a thermal conductivity of the oxidic fiber composite ceramic.

8. The tube of claim 1, wherein the oxidic fiber composite ceramic comprises $SiC/Al_2O_3$, SiC/mullite, $C/Al_2O_3$, C/mullite, $Al_2O_3/Al_2O_3$, $Al_2O_3$/mullite, mullite/$Al_2O_3$, mullite/mullite, or a mixture thereof.

9. The tube of claim 1, wherein the second layer has a thickness less than 50% of a total wall thickness.

10. The tube of claim 1, wherein the fibers of the oxidic fiber composite ceramic have a diameter in the range of from 10 to 12 μm.

11. The tube of claim 1, which is impregnated or coated with polymer, a nonporous ceramic, pyrolytic carbon, and/or a metallic material in a peripheral region.

12. The tube of claim 1, configured to overlap at least in a region of at least one layer of the tube in a longitudinal direction with a metallic gas-conducting conduit.

13. The tube of claim 1, wherein the nonporous monolithic oxide ceramic comprises at least 70 wt. % aluminum oxide.

14. A double-tube reactor suitable for endothermic reactions, the reactor comprises:
a first and a second of the tube of claim 1 arranged such that an outer composite tube encloses an inner composite tube, and
configured such that the inner composite tube is open at both ends and the outer tube is closed at one end.

15. A multilayer connecting piece, comprising:
a first layer comprising a nonporous monolithic ceramic; and
a second layer comprising a fiber composite ceramic,
wherein the multilayer connecting piece has a heat transfer coefficient of >500 W/m²/K,
wherein the first and/or the second layer has been impregnated or coated with a polymer, a nonporous ceramic, a pyrolytic carbon, a metallic material, or a mixture thereof, in a peripheral region before a transition to another material.

16. A multilayer connecting piece, comprising:
a metallic gas-conducting conduit, which in a longitudinal direction at least partially overlaps at least one layer of the tube of claim 1.

17. The piece of claim 16, further comprising:
a first tube region comprising the metallic gas-conducting conduit;
a second tube region which adjoins the first tube region and has an outer layer of fiber composite ceramic and an inner metallic layer or has an outer ceramic layer and an inner metallic layer;
a third tube region which adjoins the second tube region and has a sandwich structure comprising a metallic layer, a nonporous monolithic ceramic layer, and a fiber composite ceramic layer; and
a fourth tube region which adjoins the third tube region and comprises the tube comprising the layer of the nonporous monolithic ceramic and the layer of the fiber composite ceramic.

18. The piece of claim 16, further comprising:
a first tube region comprising the metallic gas-conducting conduit;
a second tube region which adjoins the first tube region and has a sandwich structure comprising an inner ceramic layer, a middle metallic layer, and an outer ceramic layer or comprising an inner ceramic layer, a middle ceramic layer, and an outer metallic layer, one of the ceramic layers comprising a nonporous monolithic ceramic layer and the other ceramic layer comprises a fiber composite ceramic layer; and
a third tube region which adjoins the second tube region and comprises the tube comprising the layer of the nonporous monolithic ceramic and the layer of the fiber composite ceramic.

19. A process for producing synthesis gas by at least one of:
reforming hydrocarbons with steam, carbon dioxide, or both;
coproducing hydrogen and pyrolysis carbon by pyrolysis of hydrocarbons;
preparing hydrocyanic acid from methane and ammonia or from propane and ammonia;
preparing one or more olefins by steam cracking of hydrocarbons; and
coupling methane to form ethylene, acetylene, and benzene,
wherein the process occurs in at least one apparatus comprising the multilayer composition tube of claim 1.

20. A reaction tube, comprising:
the tube of claim 1.

* * * * *